United States Patent
Gong et al.

(10) Patent No.: US 8,961,793 B2
(45) Date of Patent: Feb. 24, 2015

(54) STORM WATER TREATMENT APPARATUS AND METHOD

(71) Applicants: Terry R. Gong, Moraga, CA (US); Marcus G. Theodore, Salt Lake City, UT (US)

(72) Inventors: Terry R. Gong, Moraga, CA (US); Marcus G. Theodore, Salt Lake City, UT (US)

(73) Assignee: Earth Renaissance Technologies, LLC, Salt Lake City, UT (US)

(*) Notice: Subject to any disclaimer, the term of this patent is extended or adjusted under 35 U.S.C. 154(b) by 122 days.

(21) Appl. No.: 13/897,797

(22) Filed: May 20, 2013

(65) Prior Publication Data

US 2014/0339159 A1 Nov. 20, 2014

(51) Int. Cl.
*C02F 3/00* (2006.01)
*C02F 1/70* (2006.01)
*C02F 1/52* (2006.01)
*C02F 1/66* (2006.01)

(52) U.S. Cl.
CPC .............. *C02F 1/70* (2013.01); *C02F 1/5236* (2013.01); *C02F 1/5281* (2013.01); *C02F 1/66* (2013.01)
USPC ........... 210/607; 210/749; 210/764; 210/767; 210/150; 210/151; 210/220; 210/620

(58) Field of Classification Search
USPC ........ 210/607, 749, 764, 767, 150–151, 220, 210/620
See application file for complete search history.

(56) References Cited

U.S. PATENT DOCUMENTS

| | | | | | |
|---|---|---|---|---|---|
| 3,948,774 | A | * | 4/1976 | Lindman | 210/192 |
| 4,224,148 | A | * | 9/1980 | Lindman et al. | 210/714 |
| 6,506,347 | B1 | * | 1/2003 | Jackson | 422/161 |
| 7,967,990 | B2 | * | 6/2011 | Theodore | 210/709 |
| 2009/0294354 | A1 | * | 12/2009 | Theodore et al. | 210/602 |
| 2010/0193429 | A1 | * | 8/2010 | Harmon et al. | 210/609 |
| 2013/0087509 | A1 | * | 4/2013 | Davis et al. | 210/747.3 |

OTHER PUBLICATIONS

Chapter 2. Stormwater Impacts, www.waterkeeper.org/ht/a/GetDocumentAction/i/10521.
Eric H. Livinston, Env. Adm., Ellen McCarron, Env. Spec., Storm Water Management, A Guide for Floridians, www.dep.state.fl.us/water/nonpoint/docs/nonpoint/Stormwater_Guide.pdf.
Bill Hunt, PhD, PE, Jonathan T. Smith, PC, Eban Bean, EI, NCSU Bio & Ag Engineering Water Quality Design Storm: Sizing for the First Flush?, www.bae.ncsu.edu/stormwater/Pub.

* cited by examiner

*Primary Examiner* — Chester Barry
(74) *Attorney, Agent, or Firm* — Marcus G. Theodore

(57) ABSTRACT

A rapidly installed intermittent flow and storm water treatment method and apparatus employing rapid solids separation and sulfur dioxide chemical dewatering technology to produce disinfected reclaimed storm water with heavy metals removed and diluted nutrients suitable for open stream or land application.

10 Claims, 4 Drawing Sheets

STORM WATER TREATMENT APPARATUS AND METHOD

RELATED APPLICATIONS

This patent application claims priority of provisional patent application, Ser. No. 61/688,743 filed May 21, 2012, which is a continuation-in-part application of Ser. No. 12/927,168, issues to letters patent Jun. 5, 2012, U.S. Pat. No. 8,192,626 entitled "Wastewater Chemical/Biological Method for Open Water Discharge"

BACKGROUND OF THE INVENTION

1. Field

This invention comprises a rapidly installed intermittent flow and storm water treatment plant employing rapid solids separation and chemical dewatering technology to produce disinfected treated recovered storm water with heavy metals removed and diluted nutrients suitable for open stream and ocean discharge.

2. State of the Art

According to Wikipedia, intermittent flows such as stormwaters are waters that originate during manmade and weather precipitation events. It may also be used to apply to water that originates with snowmelt that enters a stormwater system. Stormwater that does not soak into the ground becomes surface runoff, which either flows directly into surface waterways or is channeled into storm sewers, which eventually discharge to surface waters.

Stormwater is of concern for two main issues: one related to the volume and timing of runoff water (flood control and water supplies) and the other related to potential contaminants that the water is carrying, i.e. water pollution. Because impervious surfaces (parking lots, roads, buildings, compacted soil) do not allow rain to infiltrate into the ground, more runoff is generated than in the undeveloped condition. This additional runoff can erode watercourses (streams and rivers) as well as cause flooding after the stormwater collection system is overwhelmed by the additional flow. Because the water is flushed out of the watershed during the storm event, little infiltrates the soil, replenishes groundwater, or supplies stream base flow in dry weather.

Pollutants entering surface waters during precipitation events are termed polluted runoff. Daily human activities result in deposition of pollutants on roads, lawns, roofs, farm fields, etc. When it rains or there is irrigation, water runs off and ultimately makes its way to a river, lake, or the ocean. While there is some attenuation of these pollutants before entering the receiving waters, the quantity of human activity results in large enough quantities of pollutants to impair these receiving waters.

In addition to the pollutants carried in stormwater runoff, urban runoff is being recognized as a cause of pollution in its own right. In natural catchments (watersheds) surface runoff entering waterways is a relatively rare event, occurring only a few times each year and generally after larger storm events. Before development occurred most rainfall soaked into the ground and contributed to groundwater recharge or was recycled into the atmosphere by vegetation through evapotranspiration.

Modern drainage systems, which collect runoff from impervious surfaces (e.g., roofs and roads), ensure that water is efficiently conveyed to waterways through pipe networks, meaning that even small storm events result in increased waterway flows. In addition to delivering higher pollutants from the urban catchments, increased stormwater flow can lead to stream erosion, encourage weed invasion, and alter natural flow regimes. Native species often rely on such flow regimes for spawning, juvenile development, and migration. In some areas, especially along the U.S. coast, polluted runoff from roads and highways may be the largest source of water pollution. For example, about 75 percent of the toxic chemicals getting to Seattle, Wash. Puget Sound are carried by stormwater that runs off paved roads and driveways, rooftops, yards, and other developed land.

According to Chapter 2. Stormwater Impacts, www.waterkeeper.org/ht/a/GetDocumentAction/i/10521:

"... During precipitation events or snowmelt, urban runoff takes the form of stormwater runoff—the precipitation and snowmelt that drains or runs off land surfaces and into streams and other receiving waterbodies. Under natural conditions, precipitation seeps into the ground, and filters through the soil, and recharges groundwater. Impervious surfaces are hard and rain water and melting snow cannot soak into it. As the stormwater runs over impervious surfaces like roofs, sidewalks, roads and parking lots, it picks up contaminants. Stormwater contains a deadly brew of toxic metals and chemicals, nutrients, sediments, debris, and pathogens (Natural Resources Defense Council, 2005)

While some of the stormwater universe enters our rivers and streams as non-point source pollution, much of it is either discharged through industrial or municipal storm sewer systems or from construction and other industrial facilities. According to the Clean Water Act, these discharges are point source discharges, and are subject to the Act's permitting requirements and prohibitions. Furthermore, municipal storm sewer systems often discharge pollutants even during dry weather. The Act's stormwater permitting programs include requirements for municipalities to identify and remove sources of dry weather discharges.

2.1 Water Quality, Aquatic Organisms, and Public Health

Stormwater contaminants degrade water quality and upset a waterbody's ability to maintain healthy populations of aquatic organisms. These negative impacts affect a significant proportion of Americans by contaminating drinking water sources, recreational waters, commercial fisheries, and increasing the risk of flood damage. Table 2.1.1 displays some common urban stormwater contaminants and examples of their concentrations in some stormwater.

TABLE 2.2.2

Regulated stormwater constituents, compared to freshwater acute criteria (Minton, 2005).

| Constituent | Stormwater |
|---|---|
| Cadmium (Cd) | 0.5-10 |
| Chromium (Cr) | 10-200 |
| Copper (Cu) | 5-150 |
| Iron (Fe) | 1000-10000 |
| Mercury (Hg) | 0.2-0.5 |
| Nickel (Ni) | 5-150 |
| Zinc (Zn) | 15-600 |
| Chlordane | 0.1-10 |
| Chlorpyrifos | <DL-0.10 |
| Dieldrin | 0.01-0.1 |
| Total petroleum hydrocarbons | 1-15 |
| pH | 5.5-8 |
| Ammonia | 0.1-2 |
| Nitrate | 0.1-1 |
| Turbidity | 50-100 |
| ... | |

Note:
all units ug/L except ammonia, nitrate, and TPH, which are mg/L and pH, which is in units.

2.1.1 Metals and Other Toxics

The contaminants found in stormwater have the potential to alter a waterbody's chemistry, exceed water quality standards, and affect both aquatic and human health. Heavy metals, including cadmium, chromium, copper, iron, manganese, nickel, lead and zinc, often originate from infrastructure like roads, guardrails, and construction materials. When precipitation lands on these and other impervious surfaces it picks up the contaminants. Stormwater also may pick up residual pesticides, petroleum products, and compounds such as polycyclic aromatic hydrocarbons (PAHs) that are also toxic to aquatic life.

Aquatic organisms are very sensitive to these toxins. Even a small amount can prove devastating. Toxic chemicals can delay or halt early development in aquatic organisms, as well as depress immune function. While sometimes only the smallest creatures are directly affected by some of these toxins, a reduction prey populations can have a ripple effect throughout the entire food web.

Toxic stormwater components also affect humans. Stormwater can pollute drinking water supplies, rendering the supply unsuitable for safe human consumption. Some contaminants like mercury, bioaccumulate and are stored in fatty tissue. A toxin enters the food chain at a low trophic level and becomes concentrated in the small organisms. As the small organisms are consumed by predators, the toxin is transferred to the ever-increasing consumers, and the pollutants move up the food chain. The amount of a bioaccumulative toxin that builds up in living tissue depends on the age of the organisms, what it eats, and where it is in the food chain. Toxins that bioaccumulate and biomagnify can affect generations of a species, and poison organisms higher in the food chain—including humans."

The article goes on to discuss impacts of nutrients, sediments, debris, and pathogens.

Present intermittent flows such as stormwaters routinely overwhelm the capacities of a conventional wastewater treatment plant, often requiring emergency diversion basins to collect these waters until they can gradually be run through the bioreactors of a wastewater treatment plant. Unfortunately, many wastewater treatment plants do not have available space for storm collection basins. Further, storm drains often are designed to not enter conventional wastewater treatment plants and directly enter open streams or the oceans, resulting in widespread outbreaks of disease, heavy metals contamination, and suspended solids, which adversely affect wildlife and human beings.

The First Flush

Figure 1:
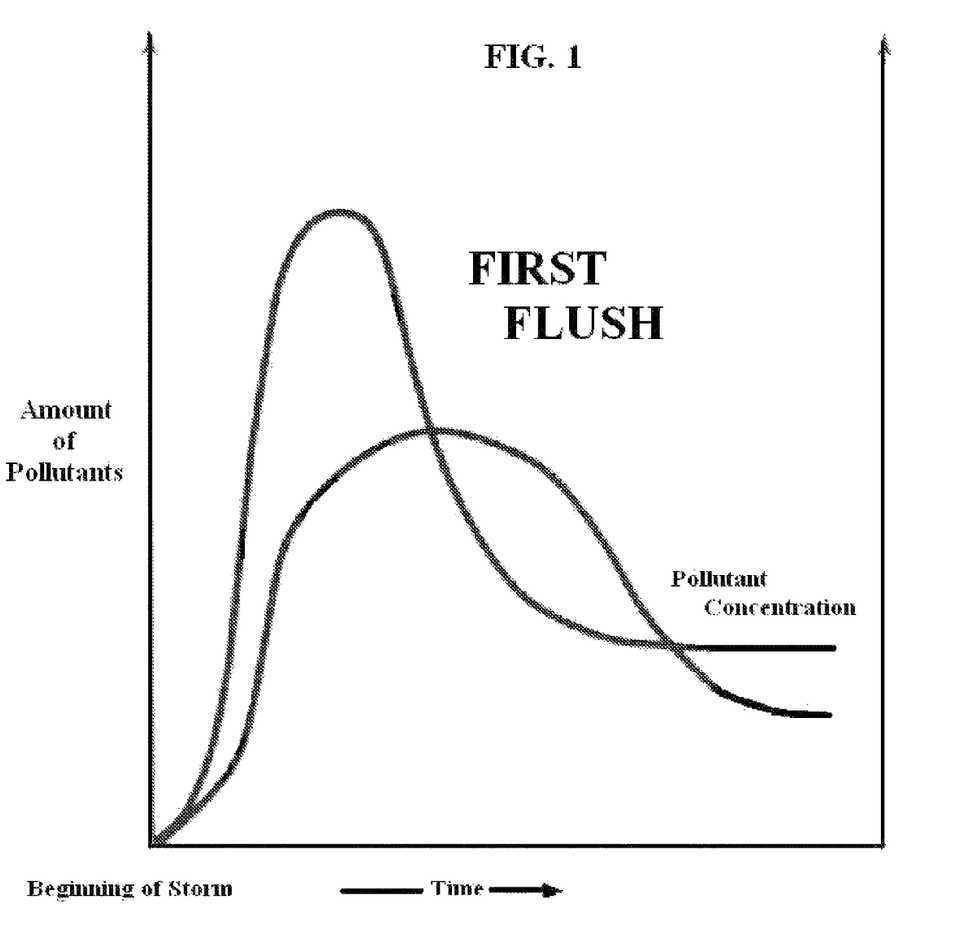
FIG. 1 illustrates the amount of pollutants in a storm.

Of primary importance to minimizing the effects of storm water on water quality is the FIRST FLUSH. This term describes the washing action that storm water has on accumulated pollutants in a watershed. In the early stages of runoff the land surfaces, especially the impervious surfaces like streets and parking areas, are flushed clean by the storm water. This creates a shock loading of pollutants. Studies in Florida have determined that the first one inch of runoff generally carries 90% of the pollution from a storm. Treatment of the first flush is the key to proper storm water management, and treatment of the first one inch of runoff from new development is the minimum needed to achieve the desired water quality benefits. In some cases, more than the first inch may need treatment-depending on the size of the drainage basis, the amount of impervious surface, the type of land use, the type of storm water management system and, most importantly, the type of receiving water and the desired water quality; see page 19, "Storm Water Management, A Guide for Floridians", prepared by Eric H. Livingston, Environmental Administrator, and Ellen McCarron, Environmental Specialist, www.dep.state.fl.us/water/nonpoint/docs/nonpoint/Stormwater_Guide.pdf Typically water quality design for sizing the First Flush is based on calculating the runoff from the first 1 to 1½ inches assuming different land infiltration characteristics; see Water Quality Design Storm: Sizing for the First Flush? By Bill Hunt, PhD, P E, Jonathan T. Smith, P E, Eban Bean, E I, NCSU Bio & Ag Engineering; www.bae.ncsu.edu/stormwater/PublicationFiles/90%.RF.DWQ.feb06.pdf. Thus, after the first flush, storm waters can often be allowed to pass without treatment as shown in FIG. 1.

There remains a need for an apparatus and method employing chemical dewatering and disinfection technology to separate and collect the solids from stormwater and provide treated disinfected and demetalized stormwater suitable for emergency release into the oceans or open streams. The device and method described below provide such an invention.

SUMMARY OF THE INVENTION

The present invention comprises a rapidly installed stormwater and intermittent flow treatment method to disinfect and separate storm water suspended solids and reduce heavy metals and pharmaceuticals and chemicals in the filtered liquids by employing combination mechanical/sulfurous acid chemical dewatering and disinfection technology for emergency treatment and release into open waters. This is accomplished by injecting sulfur dioxide into all or the first flush portion of the stormwater and holding the same at a lowered pH for the time required to disinfect the solid and liquid fractions and acid leach any heavy metals from the solids into the liquid fraction. Then using a variable flow mechanical or geotextile bag separator rapidly remove the suspended solids from the intermittant treated stormwaters, leaving a filtrate for subsequent pH adjustment to that required for open stream or land application.

The acidified separated solids are allowed to continue to drain by chemical dewatering ultimately forming a disinfected solid of less than 10% water by weight after approximately a day of drying (depending upon aridity conditions).

The type of variable flow mechanical separator is selected to provide the required mesh size for the required degree of solids separation while insuring that the liquids are rapidly removed. Any type of variable flow screened or centrifugal mechanical separator may be used; provided the solids are rapidly separated from the liquids to minimize the volume for stormwater retention.

An equalization basin to even out the storm flows through the separator may be included where violent stormflow swings are encountered. Any type of detention or storage basin may be used for this purpose, with their size determined by the design rate of solids separation system of the stormwaters.

Typical stormwaters have total and fecal coliforms >1600 MPN. These total and fecal coliforms, after sulfurous acid treatment are reduced <2 MPN, provided acid pH disinfection levels and dwell times are maintained. Typically disinfection occurs within an hour by sulfurous acid treatment below a pH of 3.5.

The levels of heavy metals in the stormwaters vary from region to region, the watershed characteristics, and the timing of the arrival of the stormwaters. Typical heavy metals in the stormwaters are:

Barium
Copper
Lead
Mercury
Molybdenum
Nickel
Zinc

These heavy metals are removed by lime addition to the filtrate liquids to precipitate the metals as metal hydroxides. The pH is selected depending upon the heavy metals to be removed.

| Metal | Optimal theoretical pH | Amphoteric |
|---|---|---|
| $Cu^{+2}$ | 8.2 | yes pH 8-12 |
| $Ni^{+}$ | 10 | yes 10-12 |
| $Pb^{+}$ | 8.9 | yes 8.9-10.6 |
| $Cd^{+}$ | 10.5 | yes 10.5-12 |
| $Cr^{+2,\,3}$ | 8.5 | yes 8.5-12 |
| $Zn+2$ | 8.5 | yes 8.5-11. |
| $Ag+$ | 12. | |

Most metal hydroxides are amphoteric and removed by raising the pH from 6.8 to 8.6. For those heavy metals requiring a higher pH, the pH may be sequentially raised in different precipitation steps resulting in metal free filtrate. For example, at higher pH levels, chromium and possibly iron and aluminum become more soluble as Fe $(OH)_4^-$ or $Al(OH)_4^-$ or $Cr(OH)_4^-$ ions. They therefore are removed at the pH at which they precipitate before the pH is then raised higher to remove other heavy metal hydroxides.

Depending upon the pH level selected:

Copper precipitates as Copper (I) hydroxide ($Cu_2O$), and Copper (II) hydroxide [$Cu(OH)_2$].

Lead (II) precipitates as Lead (II) hydroxide ($Pb(OH)_2$)

Mercury (I) precipitates as Mercury (I) chloride ($Hg_2Cl_2$) in saline influent, Mercury (I) sulfate ($Hg_2SO_4$) in sulfurous acid treatment, or Mercury (II) hydroxide (HgO) in the liming adjustment process.

Nickel precipitates as Nickel (II) hydroxide ($Ni(OH)_2$)

Zinc precipitates as Zinc hydroxide ($Zn(OH)_2$)

Therefore, unless cadmium, silver, and nickel are a problem, a pH from 6.8 to 8.6 is all that is required in most instances In addition, after sulfurous acid treatment, a calcium liming cycle is employed to remove Barium as Barium Sulfite ($BaSO_3$), and Barium Sulfate ($BaSO_4$) precipitates. Calcium in the liming process also removes phosphates as calcium phosphate and molybdenum as calcium molybdinate (CaMoO) precipitates.

Figure 2:
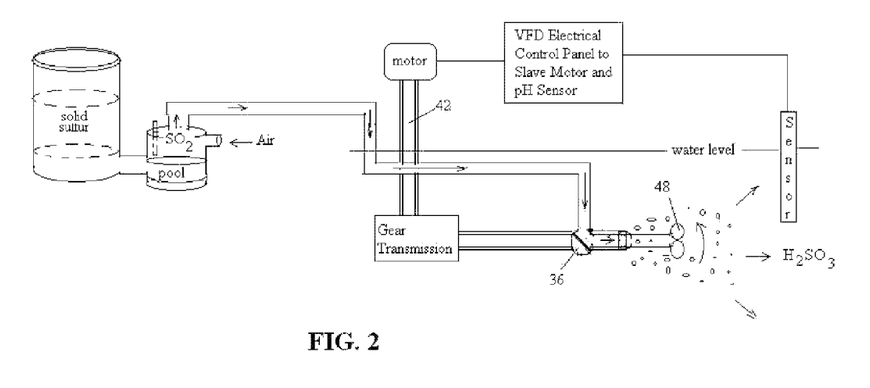
FIG. 2 illustrates a side view of a combination sulfur burner aerator mixer adapted for open stream injection of $SO_2$.

Acidification in one on-site sulfurous acid generation embodiment is accomplished by passing mechanically separated filtrate through a sulfurous acid generator before entering three tanks. The first tank mixed sulfurous acid with the suspended solids from the filtered stormwater to acid leach heavy metals from any solids remaining in solution. This acidified stormwater is sent to a second dwell tank to disinfect and agglomerate any remaining suspended solids for filtration through a first geotextile tube. The disinfected filtered effluent from the first geotextile bag is then lime adjusted and sent to a third tank to elevate the pH to precipitate out phosphorous and heavy metals and calcium precipitates. These metal hydroxides and calcium precipitates are filtered by a geotextile tube as shown in FIG. 2.

In another on-site generation embodiment, the sulfurous acid is generated on site and admixed into the stormwater directly using a combination sulfurous acid generator and gas mixer, such as that disclosed in U.S. Pat. No. 8,449,778 issued May 28, 2013, to simultaneously acidify and disinfect both the solids and liquid fractions. These acidified solids and liquids are held for the disinfection time required and then filtered to remove the self agglomerated solids, before the filtrate is then pH adjusted for heavy metals removal.

The resultant pre-treated stormwater also results in some pharmaceuticals and chemical removal from this acidification/alkalinization, oxidation/reduction separation cycle for the reasons discussed in the parent patent application.

Method

Figure 3:
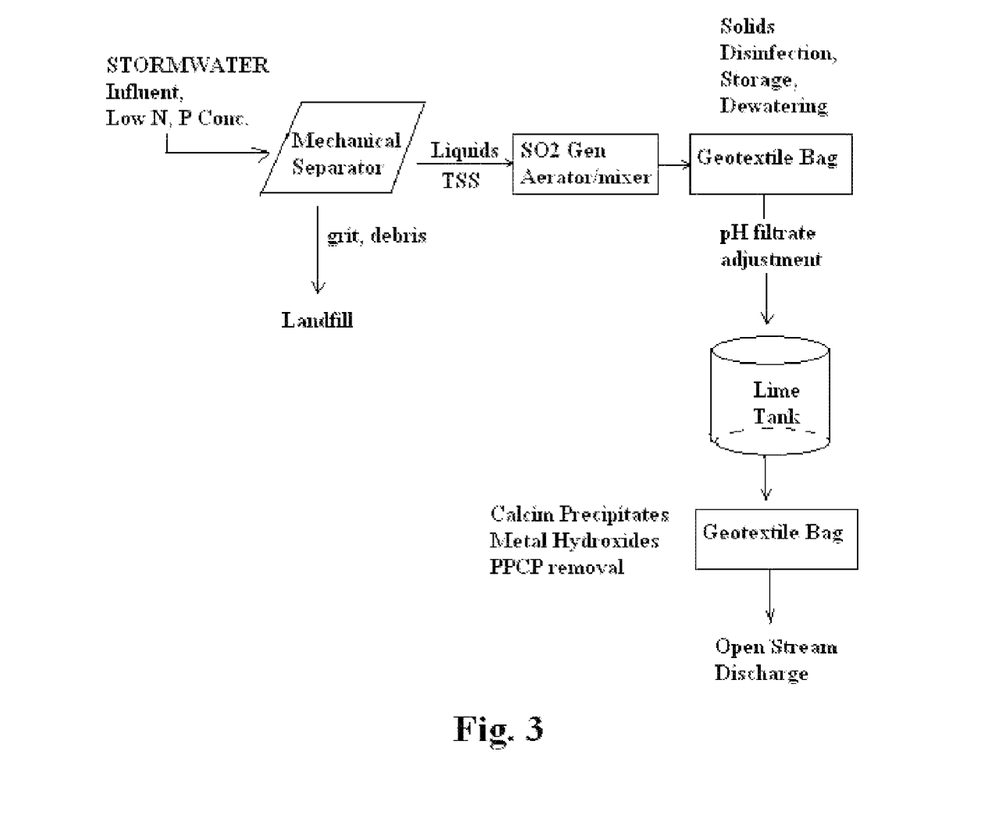
FIG. 3 illustrates a typical the layout of the stormwater treatment method.

The method comprises mechanically removing the larger suspended debris from intermittent variable flow stormwaters using typical wastewater head works screens, and chemically treating the storm water with sulfur dioxide to form sulfurous acid, ($H_2SO_3$), dissociating and to produce $H^+$, bi-sulfite ($HSO_3^-$), sulfite ($SO_3^=$), and free $SO_2$ species in solution, all hereinafter all referred to as sulfurous acid to disinfect and acid leach any heavy metals from suspended solids into the liquid fraction as shown in FIG. 3 illustrating a typical layout.

The suspended solids are then separated and collected for disposal. The larger separated suspended debris may be treated with sufficient $SO_2$ or sufficient sulfurous acid for disinfection and so that they chemically dewater when allowed to drain.

Anhydrous and hydrous sulfur dioxides are strong disinfectants. When employed, they disinfect both the liquids and solids fractions to provide liquid handling and solids storage without the emissions of odors. The recovered storm water therefore does not have viable competing organisms when discharged into open waters. Sulfur dioxide is relatively cheap and readily available. It may also be generated on-site from the burning of raw sulfur; particularly if additional heat from sulfur burning is required for solids process drying. Sulfur dioxide is extremely hydrophilic and forms sulfurous acid on contact with water.

The acidified drained solids form a fairly dry solid (approximately 4-10% water) with a BTU content approximating wood chips or shavings (~7,000 BTU/lb.). Conditioning of separated solids admixed with sewage flows with sulfurous acid generally results in a color change of the solids from a dark brown to a lighter gray brown color. Similarly, the $SO_2$ treated liquid fraction containing wastewater generally changes from a greenish color to a lighter gray brown colloidal suspension color. The malodorous smell of stormwater containing raw sewage is concomitantly replaced by a slight acidic smell. Consequently, the conditioning point can easily be determined by injecting more and more $SO_2$ into the stormwaters contaminated with sewage until the color and odor changes occur for disinfection—usually observed at a pH of approximately between 1.5 and 3.5, depending upon dwell time. An elevated pH of approximately 2 for approximately 30 minutes results in complete disinfection, at a pH of 3.5 takes an hour; see Adams et al., U.S. Pat. No. 4,340,489.

If the color changes are too faint, the pH can be measured instead. Sulfur dioxide has lone electron pairs, allowing it to act as a Lewis base. Additionally it can act as a Lewis acid. The dissolved $SO_2$ gaseous content varies with temperature. For example, the grams/liter of dissolved sulfur dioxide in water at 20 degrees C. is 106.4 gm/L. It is 55.4 gm/L at 40 degrees. It is 32.5 gm/L at 60 degrees, and 21.3 gm/L at 80 degrees. Consequently, this sulfurous acid treated wastewater system with free $SO_2$/sulfurous acid/bi-sulfite/sulfite present in solution at a low pH forms a complex liquid/gas/solid phase chemistry system where reactions are difficult to describe and quantify exactly, but the above sulfurous acid stormwater admixed with wastewater conditioning endpoints are distinct. The conditioning of the stormwater with wastewater solids via oxidation/reduction reactions thus forms: 1) self adhering solids, shedding water upon drying, and 2) disinfected stormwaters with low N and P nutrients at the point where the odor reduction and color changes of the conditioned solids and liquids occur.

After sulfur dioxide-treatment, the chemically separated solids and the resultant chemically treated water is then disposed of consistent with applicable discharge permits. For emergency stormwater releases of excess waters entering a wastewater treatment plant or beaches, the disinfected, demetalized, solids free filtrate of the present method, may be discharged directly into open waters without harming the environment as N and P levels are normally too low to cause algae blooms and fish kill. These conditioned storm waters may be admixed and blended with the more dilute storm waters after the first flush if further N and P dilution is required. If this is still not sufficient for N and P removal for open stream discharge, a biological reactor may be required.

The chemicals used for chemical dewatering are anhydrous or hydrous sulfur dioxide, which provide rapid water/solids separation. To avoid operator exposure to tanked sulfur dioxide, preferably a sulfurous acid generator is employed to generate sulfur dioxide as needed; thereby eliminating the $SO_2$ tank storage. Lime is then used to pH adjust and precipitate the heavy metals and calcium precipitates for filtration removal. These chemical reactions are very fast, resulting in easily filtered precipitates and conditioned suspended solids.

Sulfur dioxide chemically dewaters stormwaters with sewage and generates solids, which can be more readily separated from the liquid fraction via conventional screens, geotextile bags, or drying beds without the need for polymers. Sulfur dioxide dissolves readily in water requiring little mixing. Disinfected sulfur dioxide separated stormwater with suspended wastewater solids dewatering typically takes 10 minutes to an hour compared to 24 and 48 hours with conventional bioreactors.

Lesser amounts of the sulfur dioxide chemicals are required if solids/liquids separation is only required, rather than total disinfection. The dwell time required is dependent upon the alkalinity of the wastewater, and the porosity of the separation equipment screens sand filters or bags employed.

Generally, it is easier to move the solids in a 1 to 3% slurry, so the $SO_2$ is injected into the stormwater influent and held a minimal time in a pipeline or dwell tank to effectuate an initial solids separation so that the solids reach the minimal particle size to collect on an equipment filter screen, sand filter, or drain bag, etc. The solids then further dewater more completely by settling or separation within the equipment screens, filters or bags.

For those stormwater suspended solids, which may require agglomeration assistance, acid resistant polymers, such as cationic copolymers of acrylamide with a cationic monomer, or cationically modified acrylamide or polyamine, may be added to the sulfurous acidified wastewater. Other polyquaternary amines, which are pH insensitive and function well over a broad pH, may also be employed.

Because of the fast separation and chemical disinfection time, the size of the treatment vessels and drain bags is therefore materially less so the drain pad footprint is minimized. This is particularly important in recreational areas, such as beaches and mountainous areas where land is at a premium. This chemical/mechanical treated stormwater method also provides greater flexibility in equipment separation designs, resulting in further cost savings.

One preferred mobile equipment design for sewage containing stormwaters uses a sulfurous acid generator to inject sulfur dioxide into the mechanically separated stormwater diluted sewage filtrate having low N and P concentrations suitable for open stream discharge. Disinfection occurs at a pH of approximately 3.5 or lower, depending upon dwell time. At this point, stormwater/sewage odors are eliminated. The separated solids change color from a dark brown to a light gray upon the addition of sulfurous acid and are more fibrous. These separated sulfurous acid conditioned solids are passed through the pores of a woven polymer bag placed on a drain pad, whose weave porosity is selected for rapid draining of the remaining chemical dewatering without the need for further drying or treatment chemical draining of excess water from the solids.

The sulfur dioxide-treated stormwater filtrate is then rapidly pumped into and through a woven polymer bag.

Apparatus

A typical apparatus treatment layout for stormwater with low N and P concentrations suitable for open stream discharge comprises a storm water overflow diverter sending normal influent flows to a wastewater treatment facility WWTP and excess storm flows to mechanical separator, such as the Russel Finex Liquid/Solid centrifugal Separator or the Kason Cross-Flow static 150 mesh dewatering sieves, which rapidly separate solids from liquids. The separated solids are collected and pumped to a geotextile bag for storage and subsequent disinfection. The liquid filtrate is pumped through a sulfurous acid generator aerator mixer, the heart of which is a sulfur burner produced by Harmon Systems International of Bakersfield, Calif. for lowering to the pH to 3.5 or lower for disinfection. Portions of the acidified filtrate are sent to the first geotextile bag 3 for admixing with the suspended solids for their disinfection and dewatering.

A reaction vessel, shown as a tank or vessel, is in communication with the acidified stormwater. This reaction tank or vessel is sized and structured to provide the desired dwell time for effectuating disinfection of the stormwater filtrate.

After disinfection, the pH of the acidified stormwater is raised via a liming tank where calcium hydroxide is injected from a lime carboy to precipitate sulfates, phosphates, metal hydroxides and some PPCPs. These are removed via a second geotextile bag. These geotextile bags filter and store the solid precipitates, while adding oxygen to the filtrate completing the acidification/alkalinization, oxidation/reduction cycle to reduce PPCPs. The disinfected, metal and solids free filtrate is then discharged into an open stream when the N and P concentrations are not significant.

For those communities requiring covered solids containment, the separated solids may be placed in haul away covered containers, or acid resistant porous geotextile bags with a mesh sized to collect and separate the suspended solids from the treated stormwater contain solids until disposal. Polypropylene bags such as those produced by Miratech a division of Ten Cate Nicolon of Pendergrass, Ga. provide a bag, which is acid resistant, and prevents bird vector transport of the solids. Depending upon the air emissions standards, these drain bags may or may not have to be separated from the dried sludge solids contained therein before burning or gasification.

The stormwater treatment system is designed to take advantage of the disinfection and solids agglomeration properties of sulfur dioxide. The sulfur dioxide-treated solids and wastewater may therefore be held longer after initial separation to be disinfected to prevent odor generation and the spread of disease.

Where plant security is an issue, the sulfur dioxide is preferably generated as needed by employing sulfur burners which burn raw sulfur only as needed; thereby minimizing exposure from accidental tank $SO_2$ chemical release.

SUMMARY

The apparatus and method employing mechanical/chemical sulfurous acid dewatering and disinfection technology to separate the solids from the stormwater and provides treated disinfected, PPCP reduced, and demetalized stormwater filtrate suitable for emergency release into the oceans or streams or land application.

DESCRIPTION OF THE ILLUSTRATED EMBODIMENTS

FIG. 1 illustrates the amount of pollutants in storm water, the majority of which are contained in the First Flush.

FIG. 2 illustrates a side view of a combination sulfur burner aerator mixer adapted for open stream injection of $SO_2$ into a reaction zone.

FIG. 3 illustrates the typical treatment method layout for stormwater with low N and P concentrations suitable for open stream discharge discussed above.

Figure 4:
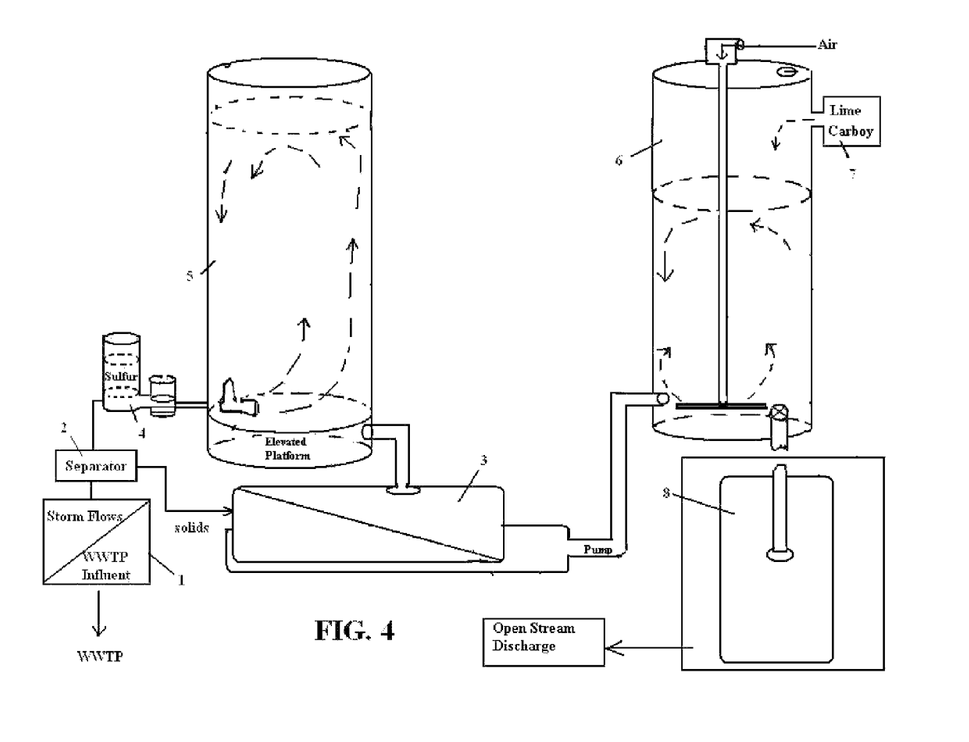
FIG. 4 illustrates an apparatus associated with the storm water influent entering a conventional wastewater treatment plant.

FIG. 4 illustrates an embodiment of a typical apparatus treatment layout for storm water with low N and P concentrations suitable for open stream discharge. The apparatus comprises a storm water overflow diverter 1 sending normal influent flows to the wastewater treatment facility WWTP for processing, and excess storm flows to a mechanical separator 2, such as the Russell Finex Liquid/Solid centrifugal Separator or the Kason Cross-Flow static 150 mesh dewatering sieves, which rapidly separate solids from liquids. The separated solids are collected and pumped to a geotextile bag 3 for storage and subsequent disinfection. The liquid filtrate is pumped through a sulfurous acid generator aerator mixer 4 the heart of which is a sulfur burner produced by Harmon Systems International of Bakersfield, Calif. for lowering to a pH 3.5 or lower for disinfection. Portions of the acidified filtrate are sent to the first geotextile bag 3 for admixing with the suspended solids for their disinfection and dewatering.

A reaction vessel, shown as a tank 5, is in communication with the acidified storm water. This reaction vessel 5 is sized and structured to provide the desired dwell time for effectuating disinfection of the storm water filtrate.

After disinfection, the pH of the acidified storm water is raised via a liming tank 6 where calcium hydroxide is injected from a lime carboy 7 to precipitate sulfates, phosphates, metal hydroxides and some PPCPs. These are removed via a second geotextile bag 8. These geotextile bags 8 filter and store the solid precipitates, while adding oxygen to the filtrate completing the acidification/alkalinization, oxidation/reduction cycle to reduce PPCPs. The disinfected, metal and solids free filtrate is then discharged into an open stream when the N and P concentrations are not significant.

The separated solids chemically dewater in geotextile bag 6 and are held until hauled and land filling.

In summary, the invention provides an apparatus and method employing mechanical/chemical sulfurous acid dewatering and disinfection technology to mechanically separate the solids from the stormwater filtrate, which is chemically treated to provide disinfected, PPCP reduced, and demetalized stormwaters suitable for emergency release into the oceans or streams.

Although this specification has made reference to the illustrated embodiments, it is not intended to restrict the scope of the claims. The claims themselves recite those features deemed essential to the invention.

We claim:

1. A method for treating initial storm water runoff of a watershed flushed clean by first storm waters resulting in concentrated loading pollutants accumulated from the watershed containing pathogens, suspended solids, toxic metals, chemicals, N, P, nutrients, grit, sediments, and debris comprising:
   a. capturing all or a portion of the initial storm water runoff,
   b. injecting sulfur dioxide into the initial storm water runoff to self-agglomerate suspended solids in a liquid phase,
   c. separating and storing the self-agglomerated suspended solids, sediments and debris for chemical dewatering from the liquid phase,
   d. raising the pH of the liquid phase with alkaline reagents to precipitate metal hydroxides and phosphorous precipitates,
   e. removing the metal hydroxides, and calcium precipitates from the liquid phase by filtration forming a filtrate, and
   f. blending and diluting the filtrate with storm waters with reduced N, P, and nutrients for open stream discharge and land application.

2. A method for treating initial storm water runoff according to claim 1, wherein the sulfur dioxide is generated as needed on-site.

3. A method for treating initial storm water runoff according to claim 1, including holding the sulfur dioxide treated initial storm water runoff for a dwell time required for disinfection.

4. A method for treating initial storm water runoff according to claim 1, including pre-filtering the initial storm water runoff to remove debris, sediments and grit.

5. A method for treating initial storm water runoff according to claim 1, wherein the filtrate is passed through a bionutrient removal system to remove N and P before open stream discharge.

6. An apparatus for treating initial storm water runoff of a watershed flushed clean by first storm waters resulting in concentrated loading pollutants accumulated from the watershed containing pathogens, suspended solids, toxic metals, chemicals, N, P, nutrients, grit, sediments, and debris comprising:
   1. a vessel or reaction zone to contain all or a portion of the initial storm water runoff,
   2. a supply of sulfur dioxide with means to inject sulfur dioxide into the initial storm water runoff to self-agglomerate suspended solids in a liquid phase,
   3. a filter for separating and storing self-agglomerated suspended solids, sediments and debris from the liquid phase for chemical dewatering, and
   4. a supply of alkaline reagents to raise the pH of the liquid phase to precipitate metal hydroxides and phosphorous, 5. a filter to remove metal hydroxides from the liquid phase forming a filtrate for discharge onto land or in an open stream, and
6. a supply of storm water runoff with reduced N, P, and nutrients for blending and diluting the filtrate for open stream discharge and land application.

7. An apparatus for treating initial storm water runoff according to claim 6, wherein the sulfur dioxide is generated as needed on-site by a combination sulfur burner gas aerator/mixer.

8. An apparatus for treating initial storm water runoff according to claim 6, including containment for holding the sulfur dioxide treated initial storm water runoff for a dwell time required for disinfection.

9. An apparatus for treating storm water runoff according to claim 6, including pre-filters for filtering the initial storm water runoff to remove debris, sediments and grit.

10. An apparatus for treating storm water runoff according to claim 6, wherein the filtrate is passed through a bionutrient removal system to remove N and P before blending and dilution for open stream discharge and land application.

\* \* \* \* \*